US012160491B2

(12) United States Patent
Sabin et al.

(10) Patent No.: US 12,160,491 B2
(45) Date of Patent: Dec. 3, 2024

(54) MANAGING LAYER TWO NETWORK EXTENSION COMMUNICATIONS USING MAXIMUM SEGMENT SIZE (MSS) MODIFICATIONS

(71) Applicant: VMware LLC, Palo Alto, CA (US)

(72) Inventors: Todd A. Sabin, Morganville, NJ (US); Uday Suresh Masurekar, Sunnyvale, CA (US); Weiqing Wu, Cupertino, CA (US); Aravind Srinivasan, Sunnyvale, CA (US)

(73) Assignee: VMware, LLC, Palo Alto, CA (US)

( * ) Notice: Subject to any disclaimer, the term of this patent is extended or adjusted under 35 U.S.C. 154(b) by 0 days.

(21) Appl. No.: 16/723,088

(22) Filed: Dec. 20, 2019

(65) Prior Publication Data
US 2021/0084125 A1 Mar. 18, 2021

Related U.S. Application Data

(60) Provisional application No. 62/900,970, filed on Sep. 16, 2019.

(51) Int. Cl.
*H04L 69/166* (2022.01)
*G06F 9/455* (2018.01)
(Continued)

(52) U.S. Cl.
CPC ........ *H04L 69/166* (2013.01); *G06F 9/45558* (2013.01); *H04L 12/4633* (2013.01);
(Continued)

(58) Field of Classification Search
CPC ....... G06F 9/45558; G06F 2009/45595; H04L 12/46; H04L 12/4604; H04L 12/4633;
(Continued)

(56) References Cited

U.S. PATENT DOCUMENTS 6,973,097 B1 * 12/2005 Donzis .................. H04L 69/166
370/470
7,275,093 B1 * 9/2007 Freed .................... H04L 69/161
709/224
(Continued)

FOREIGN PATENT DOCUMENTS

EP 1517511 A1 * 3/2005 ........... H04L 69/166

OTHER PUBLICATIONS

Zhao, Xiaoyu, et al. "Implementing Public IPv4 Sharing in IPV6 Environment." 2010 Fifth International Multi-conference on Computing in the Global Information Technology. IEEE, 2010. (Year: 2010).*

(Continued)

*Primary Examiner* — Vivek C Srivastava
*Assistant Examiner* — William C McBeth
(74) *Attorney, Agent, or Firm* — Quarles & Brady LLP

(57) ABSTRACT

Described herein are systems, methods, and software to manage the encapsulation of layer two communications across computing sites. In one example, a gateway at a first computing site may receive an encapsulated packet from a second gateway at a second computing site. After receiving the encapsulated packet, the gateway decapsulates the encapsulated packet and determines that the decapsulated packet satisfies MSS criteria. The gateway further, in response to determining that the decapsulated packet satisfies the MSS criteria, modifies an MSS option associated with the decapsulated packet to a maximum value and forwards the decapsulated packet to a destination virtual node in the first computing site.

15 Claims, 5 Drawing Sheets

(51) Int. Cl.
*H04L 12/46* (2006.01)
*H04L 12/66* (2006.01)
*H04L 69/22* (2022.01)

(52) U.S. Cl.
CPC .............. *H04L 12/66* (2013.01); *H04L 69/22* (2013.01); *G06F 2009/45595* (2013.01)

(58) Field of Classification Search
CPC ... H04L 12/4641; H04L 12/66; H04L 69/166; H04L 69/22; H04L 47/36; H04L 69/16
See application file for complete search history.

(56) References Cited

U.S. PATENT DOCUMENTS

| | | | | |
|---|---|---|---|---|
| 9,641,435 | B1* | 5/2017 | Sivaramakrishnan | ........................ H04L 69/166 |
| 2002/0147826 | A1* | 10/2002 | Sultan | ................. H04L 69/163 709/230 |
| 2004/0071140 | A1* | 4/2004 | Jason | .................... H04L 69/166 370/392 |
| 2007/0211723 | A1* | 9/2007 | Patel | ........................ H04L 69/16 370/395.31 |
| 2008/0101382 | A1* | 5/2008 | Bannerjee | ................ H04L 47/36 370/400 |
| 2008/0107026 | A1* | 5/2008 | Backman | .............. H04L 69/166 370/235 |
| 2009/0135840 | A1* | 5/2009 | Murray | .................... H04L 47/36 370/401 |
| 2011/0044241 | A1* | 2/2011 | Hapsari | ................. H04L 69/166 370/328 |
| 2011/0243063 | A1* | 10/2011 | Kuningas | .............. H04L 69/166 370/328 |
| 2012/0243410 | A1* | 9/2012 | Vedula | ................. H04L 12/4633 370/235 |
| 2012/0250703 | A1* | 10/2012 | Suzuki | .................. H04L 69/166 370/474 |
| 2012/0281559 | A1* | 11/2012 | Ner | ....................... H04L 69/163 370/252 |
| 2013/0322255 | A1* | 12/2013 | Dillon | ..................... H04L 47/22 370/236 |
| 2014/0086253 | A1* | 3/2014 | Yong | ................... H04L 12/4633 370/395.53 |
| 2015/0003449 | A1* | 1/2015 | Cui | ......................... H04L 69/16 370/389 |
| 2015/0081863 | A1* | 3/2015 | Garg | .................... H04L 12/4633 709/223 |
| 2015/0382240 | A1* | 12/2015 | Hecht | ..................... H04L 69/22 370/316 |
| 2016/0057067 | A1* | 2/2016 | Jagadish | ............. H04L 12/4641 370/230 |
| 2016/0197823 | A1* | 7/2016 | Sreeramoju | ........... H04L 69/166 370/389 |
| 2016/0226678 | A1* | 8/2016 | Sridhar | ............... H04L 12/4633 |
| 2016/0380902 | A1* | 12/2016 | Sreeramoju | ............. H04L 69/16 370/401 |
| 2017/0230300 | A1* | 8/2017 | Jagadish | ............. H04L 12/4641 |
| 2017/0339258 | A1* | 11/2017 | Momchilov | .......... H04L 69/163 |
| 2018/0191680 | A1* | 7/2018 | Ahuja | ................. H04L 63/0272 |
| 2019/0132296 | A1* | 5/2019 | Jiang | ....................... H04L 69/22 |
| 2020/0280516 | A1* | 9/2020 | Gross, IV | ............... H04L 69/22 |

OTHER PUBLICATIONS

Saad, Tarek, et al. "Tunneling techniques for end-to-end VPNs: generic deployment in an optical testbed environment." IEEE Communications Magazine 44.5 (2006): 124-132. (Year: 2006).*

Genkov, Delian, and Raycho Ilarionov. "Avoiding ip fragmentation at the transport layer of the osi reference model." Proceedings of the international conference on computer systems and technologies—CompSysTech, University of Veliko Tarnovo, Bulgaria. 2006. (Year: 2006).*

WO 2015/02808 A1, WIPO, Lindgren et al., Mar. 2015, H04L47/193 (Year: 2015).*

Custura, Ana, Gorry Fairhurst, and Iain Learmonth. "Exploring usable Path MTU in the Internet." 2018 Network Traffic Measurement and Analysis Conference (TMA). IEEE, 2018. (Year: 2018).*

* cited by examiner

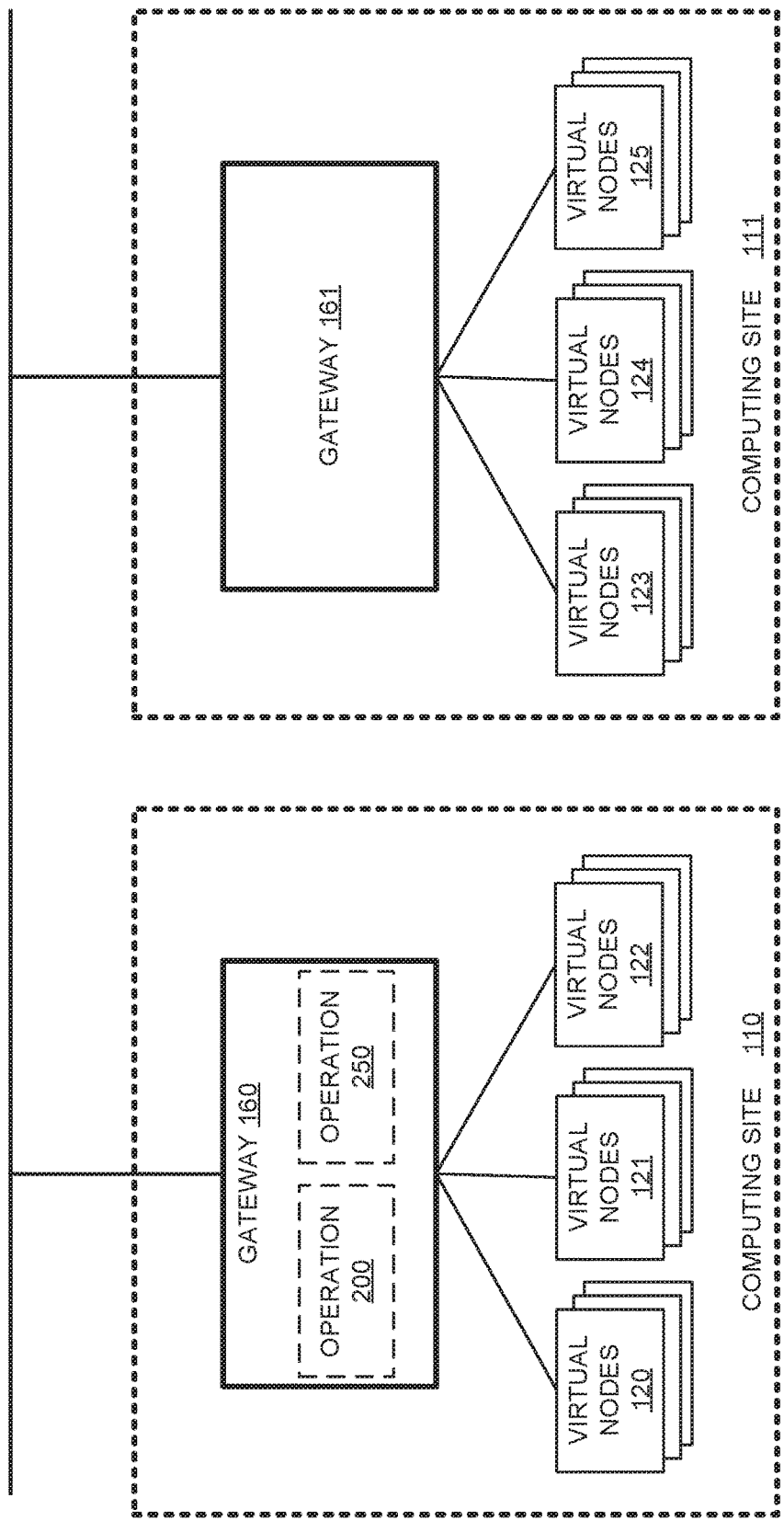

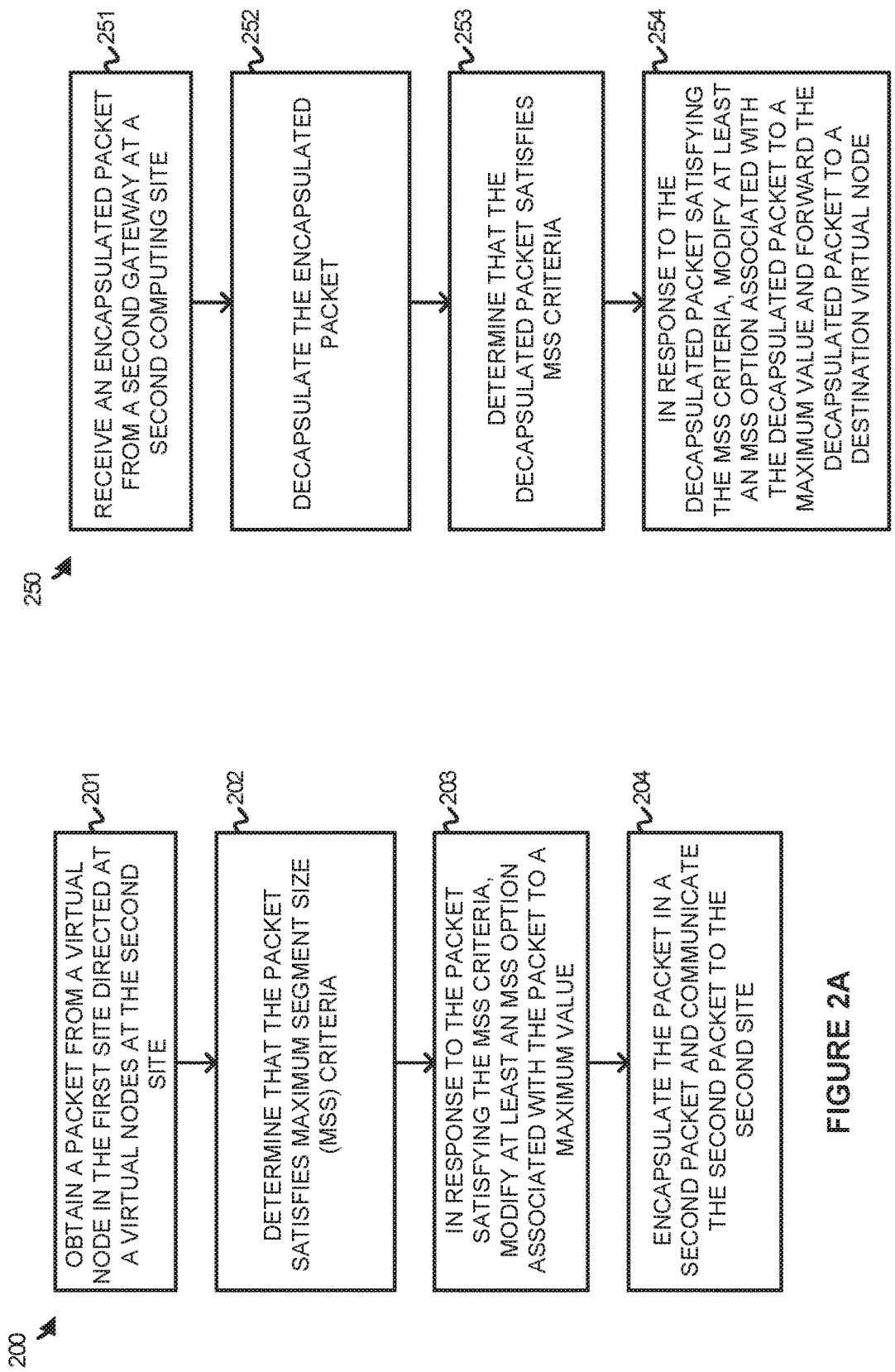

MANAGING LAYER TWO NETWORK EXTENSION COMMUNICATIONS USING MAXIMUM SEGMENT SIZE (MSS) MODIFICATIONS

RELATED APPLICATIONS

This application hereby claims the benefit of and priority to U.S. Provisional Patent Application No. 62/900,970, titled "MANAGING LAYER TWO NETWORK EXTENSION COMMUNICATIONS USING MAXIMUM SEGMENT SIZE (MMS) MODIFICATIONS," filed Sep. 16, 2019, and which is hereby incorporated by reference in its entirety.

TECHNICAL BACKGROUND

Organizations may often employ multiple computing sites to provide extended functionality across multiple locations and to provide access to additional computing elements. In some implementations, an organization may extend a layer two network across the computing sites, wherein the extension or stretching of the network permits virtual nodes, such as virtual machines or containers, to communicate over the same broadcast domain, removing the need to re-architect your network topology. In some implementations, to provide the extension of the network across multiple locations, gateways may be implemented at each of the computing sites that can identify packets directed at another computing site, encapsulate the packets, and forward the packets to the other computing site. Once received by a gateway at the destination computing site, the gateway may decapsulate the packet and forward the packet to the desired virtual node.

Although extending layer two networks provides an efficient and effective method for virtual nodes across multiple sites to communicate, difficulties can arise in the construction of the packets that are communicated between the computing sites. In particular, due to the encapsulation, the size of the packets communicated between peers may cause issues in relation to the maximum transmission unit (MTU) for the packets.

SUMMARY

The technology described herein manages the communication of packets across extended layer two networks. In one implementation, a gateway at a first computing site obtains a packet from a virtual node that is directed to a virtual node at a second computing site. In response to receiving the packet, the gateway further determines that the packet satisfies maximum segment size (MSS) criteria and, when the MSS criteria are satisfied, modifies at least an MSS option associated with the packet to a maximum value. The gateway further encapsulates the packet in a second packet and communicates the second packet to the second site.

In one implementation, a gateway at a first computing site receives an encapsulated packet from a virtual node at a second site communicated over a second gateway. After receiving the encapsulated packet, the gateway decapsulates the encapsulated packet and determines that the decapsulated packet satisfies MSS criteria. The gateway further, in response to determining that the decapsulated packet satisfies the MSS criteria, modifies an MSS option associated with the decapsulated packet to a maximum value and forwards the decapsulated packet to a destination virtual node.

BRIEF DESCRIPTION OF THE DRAWINGS

FIG. 1 illustrates a computing environment to provide extended layer two communications between computing sites according to an implementation.

FIG. 2A illustrates an operation of a gateway to provide extended layer two communications between computing sites according to an implementation.

FIG. 2B illustrates an operation of a gateway to provide extended layer two communications between computing sites according to an implementation.

DETAILED DESCRIPTION

Figure 3A:
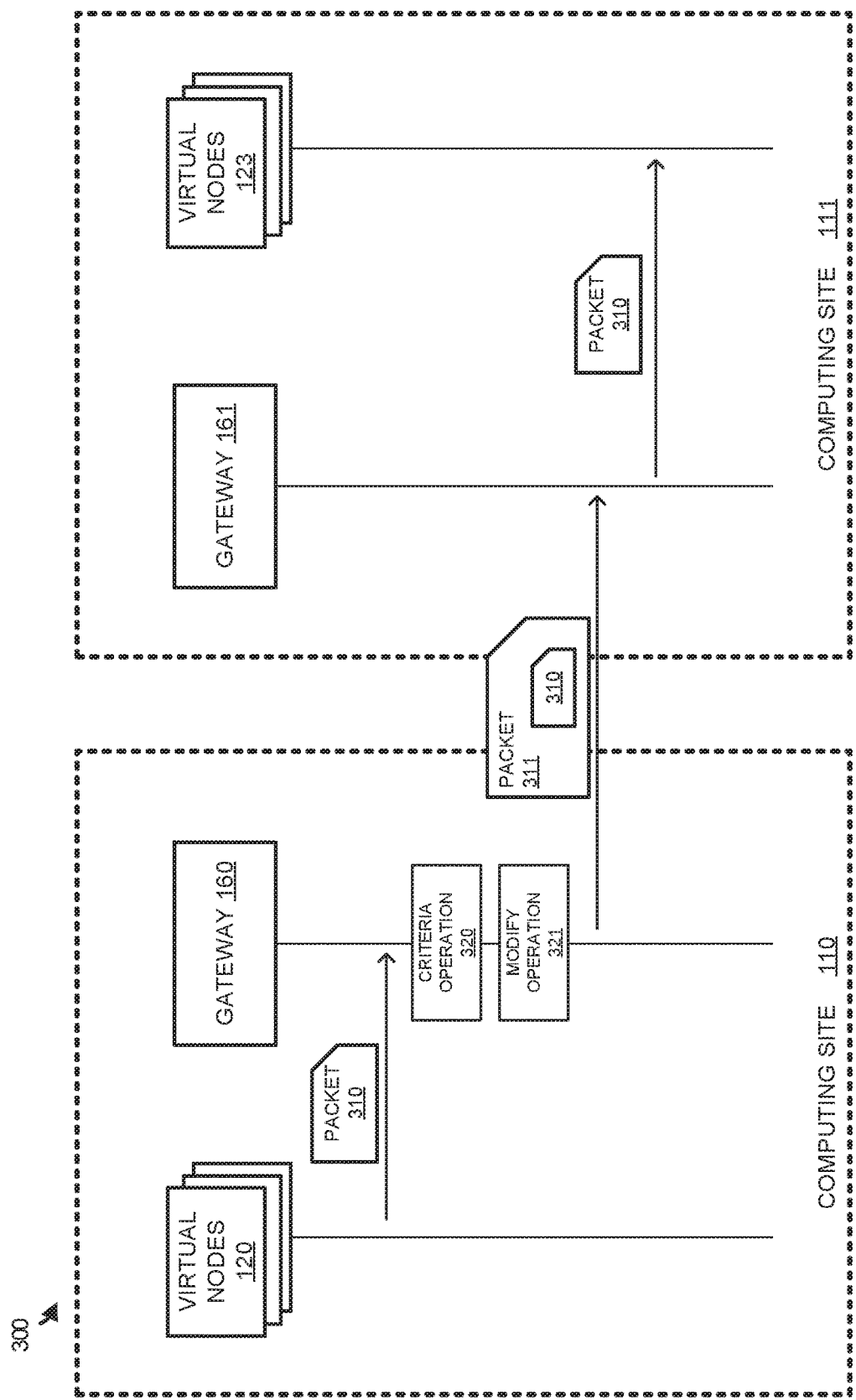
FIG. 3A illustrates an operational scenario of communicating a packet between two computing sites according to an implementation.

FIG. 1 illustrates a computing environment 100 to provide extended layer two communications between computing sites according to an implementation. Computing environment 100 includes computing sites 110-111, wherein computing sites 110-111 include gateways 160-161 and virtual nodes 120-125. Gateway 160 includes operations 200 and 250 that are further described below in FIGS. 2A and 2B. Gateways 160-161 may provide switching, routing, encapsulation, and other networking operations in association with virtual nodes 120-125. Although demonstrated with two gateways at two computing sites, it should be understood that a computing environment may employ gateways at any number of computing sites. Computing sites 110-111 may include one or more physical computing systems (servers, desktop computers, and the like) that provide a platform for virtual nodes 120-125 and software defined networking operations, such as those provided by gateways 160-161. Virtual nodes 120-125 may comprise virtual machines, containers, or some other virtualized endpoint.

In operation, an organization may deploy multiple computing sites 110-111 to connect computing resources across multiple physical locations. To support the communication between virtual nodes 120-122 of computing site 110 and virtual nodes 123-125 of computing site 111, gateways 160-161 are provided. Gateways 160-161 are representative of layer two gateways that are capable of encapsulating layer two packets from a first site and communicating the packets to a second site. For example, virtual node 120 may generate a packet that is directed at virtual node 123, when received by gateway 160, gateway 160 may encapsulate the packet, such that the packet may be communicated over the internet to gateway 161. Once received by gateway 161, gateway 161 may decapsulate the packet and provide the packet to virtual node 123.

Here, in addition to providing the encapsulation operations associated with layer two packets between computing sites, gateways 160-161 may further provide operations with respect to the maximum transmission unit (MTU) associated with the packet. In particular, the MTU is the size of the largest protocol data unit that can be communicated in a single network transaction. When virtual nodes in the layer two network communicate packets with other virtual nodes, the virtual nodes may use the full size MTU to communicate the required data. When the communication traverses computing sites, a gateway may be required to modify a maximum segment size (MSS) associated with a packet and a transmission control protocol (TCP) checksum to ensure that the packet can be communicated between virtual nodes across computing sites.

FIG. 2A illustrates an operation 200 of a gateway to provide extended layer two communications between computing sites according to an implementation. The processes of operation 200 are referenced parenthetically in the paragraphs that follow with reference to systems and elements of computing environment 100 of FIG. 1.

As depicted, gateway 160 implements operation 200 to obtain (201) a packet from a virtual node in a first computing site directed at a virtual node in a second computing site. In some implementations, packets may be provided to gateway 160 that correspond to layer two communications between virtual nodes within the same network segment, such as a local area network. Once obtained, gateway 160 may determine whether the packet is destined for a local virtual node (i.e., another virtual node in computing site 110 or a virtual node at computing site 111). If the packet is destined for a local virtual node, then no encapsulation is required and the packet may be forwarded, blocked, or otherwise processed using local software defined networking rules for the packet. In contrast, when the packet is destined for a virtual node at another computing site, gateway 160 may be responsible for implementing encapsulation operations with respect to the packet.

Here, when a packet is received from a virtual node of virtual nodes 120-122, gateway 160 determines that the packet is destined for a virtual node in computing site 111 and determines (202) that the packet satisfies MSS criteria. In determining that the packet satisfies MSS criteria, gateway 160 may determine that the packet ethertype comprises IP, determine the packet length for the packet is large enough for IP and TCP headers, determine that the IP protocol is TCP, determine that the TCP sync flag is set, determine that a TCP MSS option (also referred to as "MSS option") is present in the packet, determine the MSS option is greater than a maximum permitted, or determine some other criteria associated with the packet, including combinations thereof. In response to the packet satisfying the MSS criteria, operation 200 may modify (203) at least an MSS option associated with the packet to a maximum value. This maximum value may be defined by user selection, based on auto-detection in a data plane based on path MTU (PMTU) discovery, or, when multiple uplinks are present in the environment, calculate the value based on the smallest uplink MTU of the environment. Additionally, gateway 160 may modify a transmission control protocol (TCP) checksum associated with the packet based on the modification of the MSS option. By modifying the values associated with the packet, the packet may be communicated between virtual nodes across computing sites without causing fragmentation of the packet into multiple packets at gateway 160 prior to encapsulation.

In addition to modifying the MSS option and, in some examples, changing the TCP checksum associated with the packet, operation 200 further encapsulates (204) the packet in a second packet and communicates the packet to the second computing site. The encapsulation may generate a Virtual Extensible Local Area Network (VXLAN) packet, a Generic Network Virtualization Encapsulation (GENEVE) packet, or some other similar tunneling protocol packet. Referring to an example from computing environment 100, when a virtual node in computing site 110 communicates a packet that is obtained by gateway 160, gateway 160 may determine whether the packet is destined for a virtual node at another computing site. When it is destined for another computing site, such as computing site 111, gateway 160 may determine whether the packet satisfies the MSS criteria and, when satisfied, modify at least an MSS option associated with a packet to a maximum value. In addition to modifying the MSS option, gateway 160 will encapsulate the packet and communicate the encapsulated packet to gateway 161.

In some implementations, the packet that is obtained from the virtual node at computing site 110 may not satisfy the required MSS criteria to make the modifications to an MSS option associated with the packet. In these examples, gateway 160 may separate or fragment the packet into multiple packets prior to encapsulation, such that the encapsulation does not prevent the packet from being communicated to gateway 161 or another gateway that provides a layer two extension in the computing environment.

FIG. 2B illustrates an operation 250 of a gateway to provide extended layer two communications between computing sites according to an implementation. The processes of operation 250 are referenced parenthetically in the paragraphs that follow with reference to systems and elements of computing environment 100 of FIG. 1.

As depicted, operation 250 includes receiving (251) an encapsulated packet from a second gateway at a second computing site. In response to receiving the encapsulated packet, operation 250 may decapsulate (252) the encapsulated packet and determine (253) that the decapsulated packet satisfies MSS criteria. For example, a packet may be communicated by a virtual node of virtual nodes 123 to gateway 160 over gateway 161, wherein gateway 161 may be responsible for encapsulating the packet prior to traversing the connection to gateway 160. When the encapsulated packet is received, gateway 160 may decapsulate the encapsulated packet and determine whether the decapsulated packet satisfies MSS criteria. In determining whether the packet satisfies the MSS criteria, gateway 160 may determine that the packet ethertype comprises IP, determine the packet length for the packet is large enough for IP and TCP headers, determine that the IP protocol is TCP, determine that the TCP sync flag is set, determine that a MSS option is present in the packet, determine the MSS option is greater than a maximum permitted, or determine some other criteria associated with the packet, including combinations thereof.

In response to determining that the decapsulated packet satisfies the MSS criteria, operation 200 will further modify (254) an MSS option associated with the decapsulated packet to a maximum value and forward the decapsulated packet to a destination virtual node. In some implementations, the maximum value may be based on the MTU associated with the connection between the two gateways. In some examples, the maximum value may be defined by an administrator associated with the computing environment, may be based on MTU discovery, or may be based on some other mechanism. Additionally, in some examples, operation 200 and gateway 160 may modify a TCP checksum associated with the decapsulated packet based on the modification of the MSS option, wherein the checksum is used to detect corruption of data over a TCP or IPv4 connection. Once the modifications are complete, the packet may be communicated to the corresponding virtual node in virtual nodes 120-122. Here, by modifying the value associated with the MSS option gateway 160 may be able to limit fragmentation and/or limit the risk of undelivered packets in computing environment 100.

In some implementations, it should be understood that both the transmitting and the receiving gateway may perform operations 200 and 250. For example, both gateway 160 and 161 may provide the MSS modifications described herein for transmitted and received packets. However, it should be understood that a single gateway may perform the operations in some examples. In some implementations, when a gateway performs both operations 200 and 250, the MTU limitations for the uplink (transmitted packets) and downlink (received packets) for gateways may be different. For example, the uplink MTU for gateway 160 to gateway 161 may be different than the downlink from gateway 161 to gateway 160. As a result, the MSS option for uplink packets may be different than downlink packets, however, it should be understood that the values for the MSS option may be equivalent in some examples. Further, information about the uplink and downlink MTUs may be learned via user or administrator specification or may be based on learned or discovered MTUs associated with the connected gateways to gateway 160.

FIG. 3A illustrates an operational scenario 300 of communicating a packet between two computing sites according to an implementation. Operational scenario 300 includes elements from computing sites 110-111 of computing environment 100 of FIG. 1. In particular, operational scenario 300 includes virtual nodes 120, gateways 160-161, and virtual nodes 123. The remaining virtual nodes of computing environment 100 have been omitted for the sake of clarity. Operational scenario 300 further includes packet 310, packet 311, criteria operation 320, and modify operation 321.

In operation, a virtual node in virtual nodes 120 generates packet 310 that is provided to gateway 160, wherein gateway 160 may represent a layer two network extender. In particular, gateway 160 may be used to extend a layer two network associated with virtual nodes 120-122 to additional computing elements, represented by virtual nodes 123-125. In some examples, when the packet is obtained by gateway 160, gateway 160 may determine whether the packet is destined for a local virtual node or a virtual node in another computing site. When it is determined that packet 310 is destined for a virtual node in computing site 111, gateway 160 may perform criteria operation 320, which can be used to determine whether packet 310 satisfies MSS criteria. The MSS criteria may include determining that the packet ethertype comprises IP, determining the packet length for the packet is large enough for IP and TCP headers, determining that the IP protocol is TCP, determining that the TCP sync flag is set, determining that a MSS option is present in the packet, determining the MSS option is greater than a maximum permitted, or determine some other criteria associated with packet 310, including combinations thereof.

Once it is determined that the packet meets the criteria, modify operation 321 is used to modify attributes associated with the packet. In one implementation, modify operation 321 may be used to modify an MSS option associated with the packet to a maximum value that can be defined by a user or through learning information from the computing environment. The MSS option specifies the largest amount of data that a communications device can receive in a single TCP segment. In some examples, modify operation 321 may further modify a TCP checksum associated with the packet based on the modification of the MSS option. The TCP checksum is used to detect corruption of data over a TCP connection or IPv4 connection. Once the modifications are made in association with packet 310, the packet is encapsulated as packet 311 and transferred over the internet to gateway 161. Gateway 161 may then decapsulate the packet and provide the packet to a virtual node in virtual nodes 123.

Figure 3B:
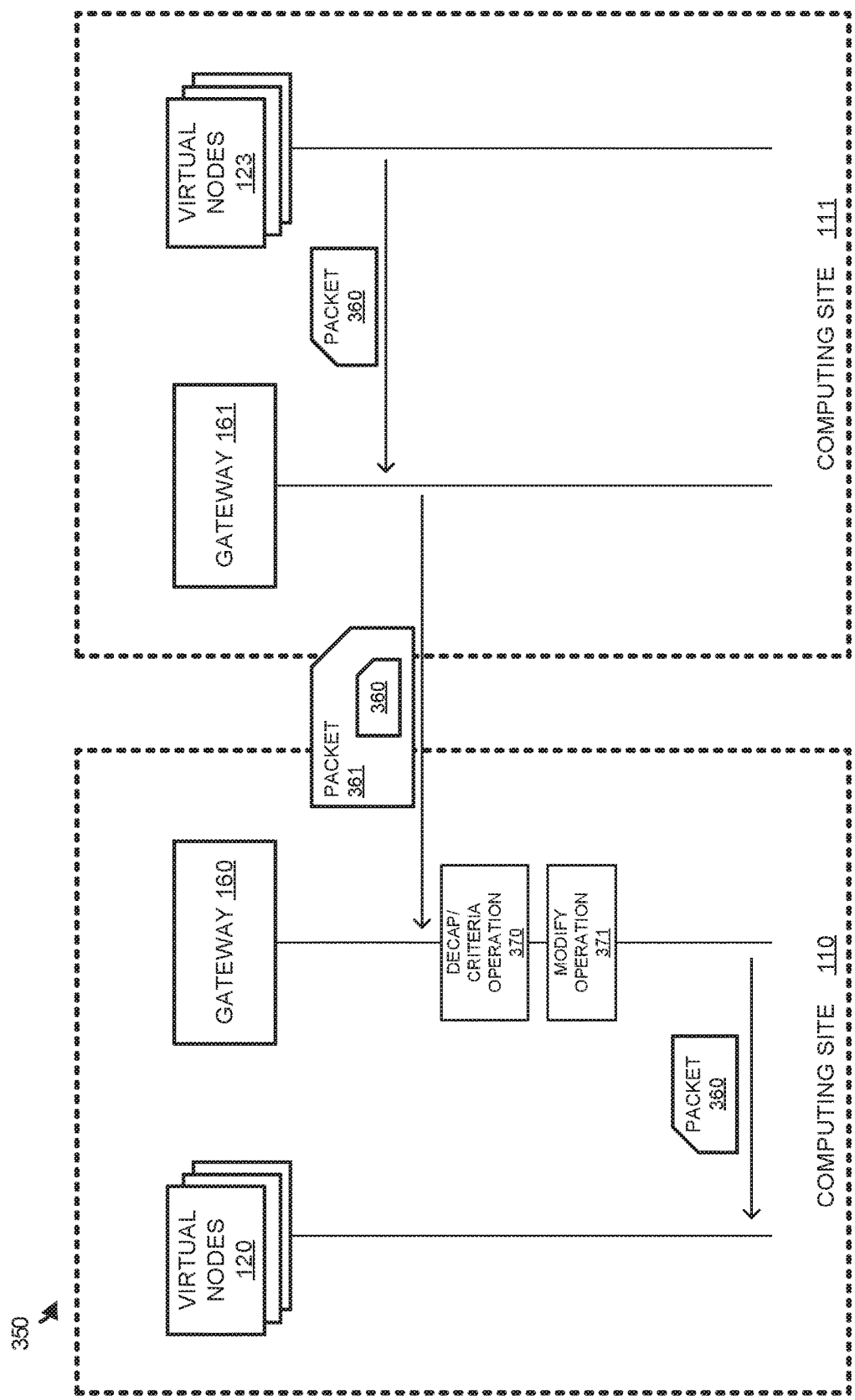
FIG. 3B illustrates an operational scenario of communicating a packet between two computing sites according to an implementation.

FIG. 3B illustrates an operational scenario 350 of communicating a packet between two computing sites according to an implementation. Operational scenario 350 includes elements from computing sites 110-111 of computing environment 100 of FIG. 1. In particular, operational scenario 350 includes virtual nodes 120, gateways 160-161, and virtual nodes 123. The remaining virtual nodes of computing environment 100 have been omitted for the sake of clarity. Operational scenario 350 further includes packet 360, packet 361, decapsulation and criteria operation 370, and modify operation 371.

In operation, a virtual node in virtual nodes 123 may generate a packet 360 that is destined for a virtual node in virtual nodes 120. To provide the communication, packet 360 is obtained by gateway 161 and encapsulated as packet 361 prior to forwarding to gateway 160 at computing site 110. When the packet is received by gateway 160, gateway 160 may perform decapsulation and criteria operation 370. Decapsulation and criteria operation 370 is used to decapsulate packet 360 from packet 361 and determine whether the attributes in packet 360 satisfy MSS criteria. In some implementations, in determining whether packet 360 satisfies the criteria, operation 370 may determine that the packet ethertype comprises IP, determine the packet length for the packet is large enough for IP and TCP headers, determine that the IP protocol is TCP, determine that the TCP sync flag is set, determine that a MSS option is present in the packet, determine the MSS option is greater than a maximum permitted, or determine some other criteria associated with the packet, including combinations thereof. These determinations may be made using packet inspection of packet 360.

If the packet does not meet the criteria associated with operation 370, then the packet may be forwarded, dropped, fragmented, or provided with some other operation. In contrast, if the packet does meet the criteria associated with operation 370, gateway 160 may perform modify operation 371 that is used to modify one or more attributes inside packet 360. In some implementations, the modification may include setting at least an MSS option associated with packet 360 to a maximum value, wherein the maximum value may be based on an administrator or user setting, may be based on MTU observations for the network, or may be based on some other factor. In some examples, in addition to modifying or setting the MSS option value, modify operation 371 may further modify a TCP checksum associated with the decapsulated packet based on the modification of the MSS option. Other operations on packet 360 may also be provided to reflect a modification to the MSS option. Once the packet is modified, packet 360 may be provided to the corresponding virtual node in virtual nodes 120.

In some implementations, both the sending and receiving gateways may implement the operations to modify at least the MSS option within a packet. However, it should be understood that a single gateway may implement the operations in some examples. In at least one implementation, gateway 160 may be provided with information about other gateways in the computing environment, such as the MTU information for communications between the gateways and may update the MSS option in decapsulated packets based on the MTU information. This may include updating the maximum value associated with the MSS to limit fragmentation and/or limit the risk of undelivered packets in computing environment 100.

Figure 4:
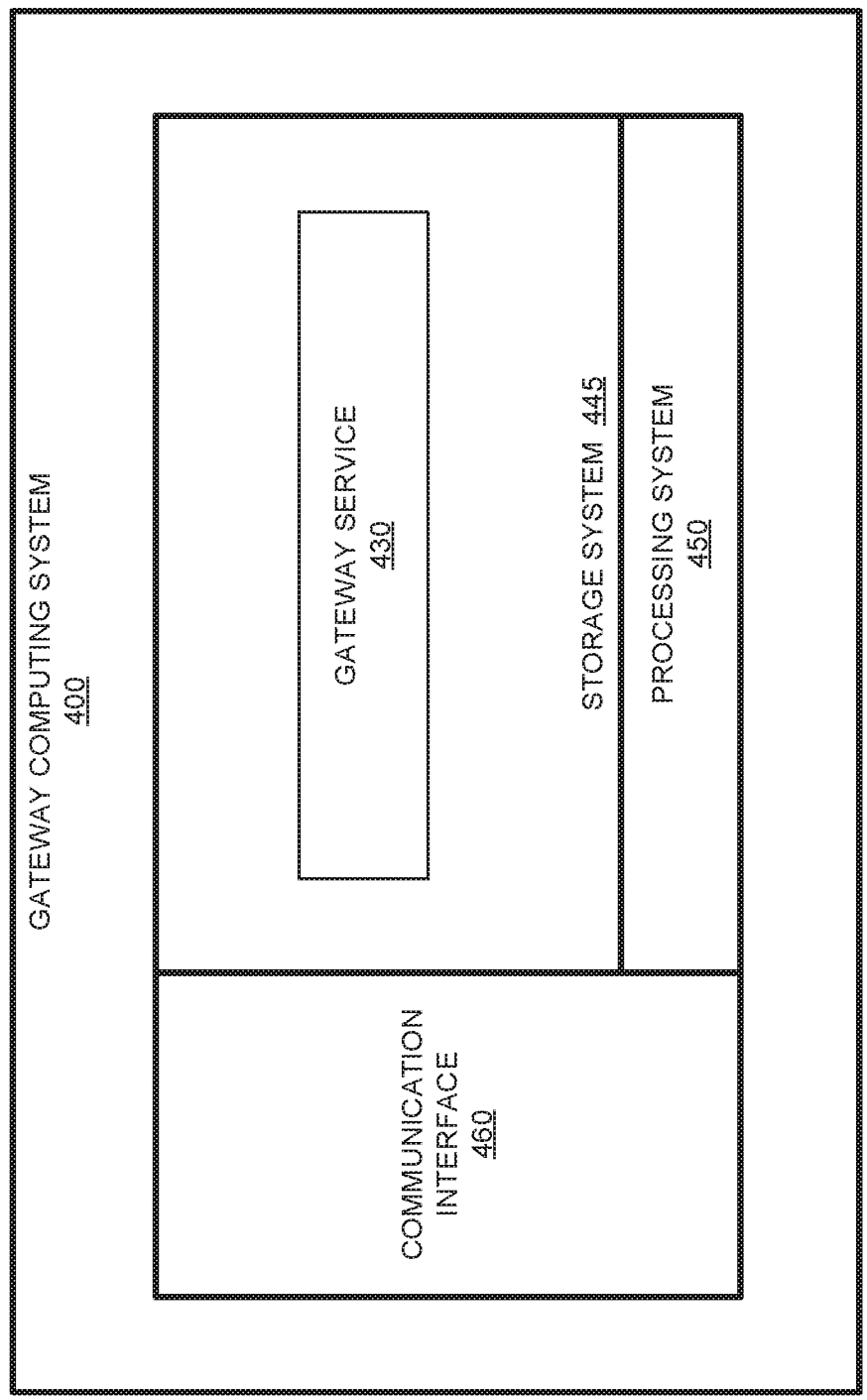
FIG. 4 illustrates a gateway computing system according to an implementation.

FIG. 4 illustrates a gateway computing system 400 according to an implementation. Computing system 400 is representative of any computing system or systems with which the various operational architectures, processes, scenarios, and sequences disclosed herein for a layer two gateway can be implemented. Computing system 400 is an example of gateways 160-161 of FIG. 1, although other examples may exist. Computing system 400 includes storage system 445, processing system 450, and communication interface 460. Processing system 450 is operatively linked to communication interface 460 and storage system 445. Communication interface 460 may be communicatively linked to storage system 445 in some implementations. Computing system 400 may further include other components such as a battery and enclosure that are not shown for clarity.

Communication interface 460 comprises components that communicate over communication links, such as network cards, ports, radio frequency (RF), processing circuitry and software, or some other communication devices. Communication interface 460 may be configured to communicate over metallic, wireless, or optical links. Communication interface 460 may be configured to use Time Division Multiplex (TDM), Internet Protocol (IP), Ethernet, optical networking, wireless protocols, communication signaling, or some other communication format—including combinations thereof. Communication interface 460 is configured to communicate with other gateways that implement an extension of a layer two network at other computing sites. Communication interface 460 may further communicate with other computing systems that can provide a platform for virtual nodes and software defined networking elements, such as logical switches, logical routers, and the like.

Processing system 450 comprises microprocessor and other circuitry that retrieves and executes operating software from storage system 445. Storage system 445 may include volatile and nonvolatile, removable and non-removable media implemented in any method or technology for storage of information, such as computer readable instructions, data structures, program modules, or other data. Storage system 445 may be implemented as a single storage device but may also be implemented across multiple storage devices or sub-systems. Storage system 445 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 450 is typically mounted on a circuit board that may also hold the storage system. The operating software of storage system 445 comprises computer programs, firmware, or some other form of machine-readable program instructions. The operating software of storage system 445 comprises gateway service 430 capable of providing at least operations 200 and 250 of FIGS. 2A and 2B. The operating software on storage system 445 may further include an operating system, utilities, drivers, network interfaces, applications, or some other type of software. When read and executed by processing system 450 the operating software on storage system 445 directs computing system 400 to operate as described herein.

In at least one implementation, gateway service 430 may obtain packets from one or more virtual nodes that operate as part of the same computing site with computing system 400. When a packet is obtained, gateway service 430 may determine whether the destination associated with the packet corresponds to another computing service. After determining that the packet is associated with another computing site, gateway service 430 may determine that the packet satisfies MSS criteria. Once satisfying the criteria, gateway service 430 may modify at least an MSS option associated with the packet to a maximum value. In addition to modifying the MSS option, gateway service 430 may further encapsulate the packet in a second packet and communicate the second packet to the second site.

In some implementations, in addition to modifying the MSS option, gateway service 430 may further modify the TCP checksum associated with the packet. In other examples, other operations may be performed to modify the packet for encapsulation. The encapsulation may comprise a Virtual Extensible Local Area Network (VXLAN) packet, a Generic Network Virtualization Encapsulation (GENEVE) packet, or some other similar tunneling protocol packet.

In some implementations, in addition to or in place of providing MSS modification operations for packets transmitted from gateway computing system 400 to another gateway computing system, gateway service 430 may further be configured to modify packets received at communication interface 460 from another gateway in the computing environment. In particular, gateway service 430 may direct processing system 450 to receive an encapsulated packet from a second gateway at a second computing site. Once received, gateway service 430 may direct processing system 450 to decapsulate the encapsulated packet and determine when the decapsulated packet satisfies MSS criteria. If the decapsulated packet fails to satisfy the criteria, then the received decapsulated packet may be provided to a virtual node at the computing site associated with gateway computing system 400 without modifications to the packet, may be blocked, may be fragmented, or may be provided with some other operation.

In contrast, when the packet is determined to meet the MSS criteria, gateway service 430 may set at least an MSS option associated with the decapsulated packet to a maximum value and forward the decapsulated packet to a destination virtual node in the computing site associated with gateway computing system 400. In some examples, the maximum value may be based on the available MTU between the sending gateway and gateway computing system 400. In particular, the MSS option may be set to a value that is small enough to ensure that no packets are dropped between the communicating gateways. The MSS options may be selected by an administrator or may be selected based on learned properties regarding the MTU requirements between the various gateways of the computing environment.

In some examples, each edge gateway may be configured to provide the sending and receiving operations associated with the MSS option value, however, it should be understood that only a single gateway may be required to implement the MSS option value operations. In particular, when a gateway provides operations pre-encapsulation and post-decapsulation, the gateway may not require other gateways to provide the same operations.

Returning to the elements of FIG. 1, computing site 110-111 may include computing systems capable of providing a platform for gateways 160-161. These computing systems may include server computing systems, switches, routers, desktop computing systems, or some other type of computing system. The computing systems may each comprise communication interfaces, network interfaces, processing systems, computer systems, microprocessors, storage systems, storage media, or some other processing devices or software systems, and can be distributed among multiple devices. The computing systems may include software such as an operating system, logs, databases, utilities, drivers, networking software, and other software stored on a computer-readable medium.

Communication between gateways 160-161 may use metal, glass, optical, air, space, or some other material as the transport media. Communication between gateways 160-161 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between gateways 160-161 may be a direct link or can include intermediate networks, systems, or devices, and can include a logical network link transported over multiple physical links The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a gateway at a first computing site, the method comprising:
    receiving a first packet encapsulated in a second packet from a second gateway at a second computing site;
    decapsulating the second packet to obtain the first packet;
    determining a maximum value for a maximum segment size (MSS) option in the first packet based on a maximum transmission unit (MTU) for received packets from the second gateway at the gateway;
    determining that the first packet satisfies one or more criteria, the one or more criteria being associated with one or more packet attributes;
    in response to determining that the first packet satisfies the one or more criteria:
        setting at least an MSS option in the first packet to the maximum value; and
        forwarding the first packet to a destination virtual node in the first computing site;
    obtaining a third packet;
    determining that the third packet is destined for a virtual node in the second computing site;
    determining a second maximum value for a second MSS option in the third packet based on a second MTU for packets transmitted from the gateway to the second gateway, wherein the second maximum value is different from the maximum value;
    determining that the third packet satisfies one or more second criteria;
    in response to determining that the third packet satisfies the one or more second criteria:
        setting at least the second MSS option in the third packet to the second maximum value;
        encapsulating the third packet in a fourth packet; and
        communicating the fourth packet to the second gateway;
    wherein the determining that the first packet satisfies the one or more criteria comprises:
        determining that a packet ethertype associated with the first packet comprises internet protocol (IP); and
        determining that a packet length for the first packet is large enough for IP and transmission control protocol (TCP) headers.

2. The method of claim 1 further comprising modifying a transmission control protocol (TCP) checksum associated with the first packet based on the setting of the MSS option.

3. The method of claim 1 further comprising modifying a transmission control protocol (TCP) checksum associated with the third packet based on the second maximum value.

4. The method of claim 1 further comprising determining the second maximum value based on at least a discovered maximum transmission unit (MTU) for the uplink from the gateway.

5. The method of claim 1, wherein the one or more criteria comprises at least one of a packet ethertype, a packet length, an IP protocol, a TCP sync flag, and an MSS option.

6. The method of claim 1, wherein the maximum value is determined by user selection.

7. The method of claim 1, wherein the maximum value is determined based on a path MTU discovery.

8. The method of claim 1, wherein the maximum value is determined based on a smallest uplink MTU.

9. A computing apparatus comprising:
    a storage system;
    a processing system operatively coupled to the storage system;
    program instructions stored on the storage system to operate a gateway at a first computing site that, when executed by the processing system, direct the processing system to:
    receive a first packet encapsulated in a second packet from a second gateway at a second computing site;
    decapsulate the encapsulated second packet to obtain the first packet;
    determine a maximum value for a maximum segment size (MSS) option in the first packet to limit fragmentation based on a maximum transmission unit (MTU) for received packets between the gateway and from the second;
    determine that the first packet satisfies one or more criteria, the one or more criteria being associated with one or more packet attributes;
    in response to determining that the first packet satisfies the one or more criteria:
        set at least the MSS option in the first packet to the maximum value; and
        forward the first packet to a destination virtual node in the first computing site;
    obtain a third packet;
    determine that the third packet is destined for a virtual node in the second computing site;
    determine a second maximum value for a second MSS option in the third packet based on a second MTU for packets transmitted from the gateway to the second gateway, wherein the second maximum value is different from the maximum value;
    determine that the third packet satisfies one or more second criteria;
    in response to determining that the third packet satisfies the one or more second criteria:
        set at least the second MSS option in the third packet to the second maximum value;
        encapsulate the third packet in a fourth packet; and communicate the fourth packet to the second gateway;
wherein the determining that the first packet satisfies the one or more criteria comprises:
    determining that a packet ethertype associated with the first packet comprises internet protocol (IP);
    determining that a packet length for the first packet is large enough for IP and transmission control protocol (TCP) headers.

10. The computing apparatus of claim 9, wherein the program instructions further direct the processing system to modify a transmission control protocol (TCP) checksum associated with the first packet based on the modification of the MSS option.

11. The computing apparatus of claim 9, wherein the program instructions further direct the processing system to modify a transmission control protocol (TCP) checksum associated with the third packet based on the modification on the second maximum value.

12. The computing apparatus of claim 9, wherein the program instructions further direct the processing system to determine the second maximum value based on at least a discovered maximum transmission unit (MTU) for the uplink from the gateway.

13. A computing system comprising:
a first gateway at a first computing site, wherein the first gateway comprises a first computer and is configured to:
    communicate a first packet encapsulated in a second packet to a second gateway at a second computing site; and
the second gateway at the second computing site, wherein the second gateway comprises a second computer and is configured to:
    receive the second packet from the first gateway;
    decapsulate the second packet to obtain the first packet;
    determine a maximum value for a maximum segment size (MSS) option in the first packet based on a maximum transmission unit (MTU) for received packets from the first gateway at the second gateway;
    determine that the first packet satisfies one or more criteria, the one or more criteria being associated with one or more packet attributes;
    in response to determining that the first packet satisfies the one or more criteria:
        set at least the MSS option in the first packet to the maximum value; and
        forward the first packet to a destination virtual node in the second computing site;
    obtain a third packet;
    determine that the third packet is destined for a virtual node in the second computing site;
    determine a second maximum value for a second MSS option in the third packet based on a second MTU for packets transmitted from the second gateway to the first gateway, wherein the second maximum value is different from the maximum value;
    determine that the third packet satisfies one or more second criteria;
    in response to determining that the third packet satisfies the one or more second criteria:
        set at least the second MSS option in the third packet to the second maximum value;
        encapsulate the third packet in a fourth packet; and
        communicate the fourth packet to the first gateway;
    wherein the determining that the first packet satisfies the one or more criteria comprises:
        determining that a packet ethertype associated with the first packet comprises internet protocol (IP); and
        determining that a packet length for the first packet is large enough for IP and transmission control protocol (TCP) headers.

14. The computing system of claim 13, wherein the second gateway is further configured to modify a transmission control protocol (TCP) checksum associated with the first packet based on the setting of the MSS option.

15. The computing system of claim 13, wherein the second gateway is further configured to modify a transmission control protocol (TCP) checksum associated with the third packet based on the second maximum value.

* * * * *